(No Model.)
J. C. KNOBLOCK.
PULLEY.
No. 605,104.
Patented June 7, 1898.
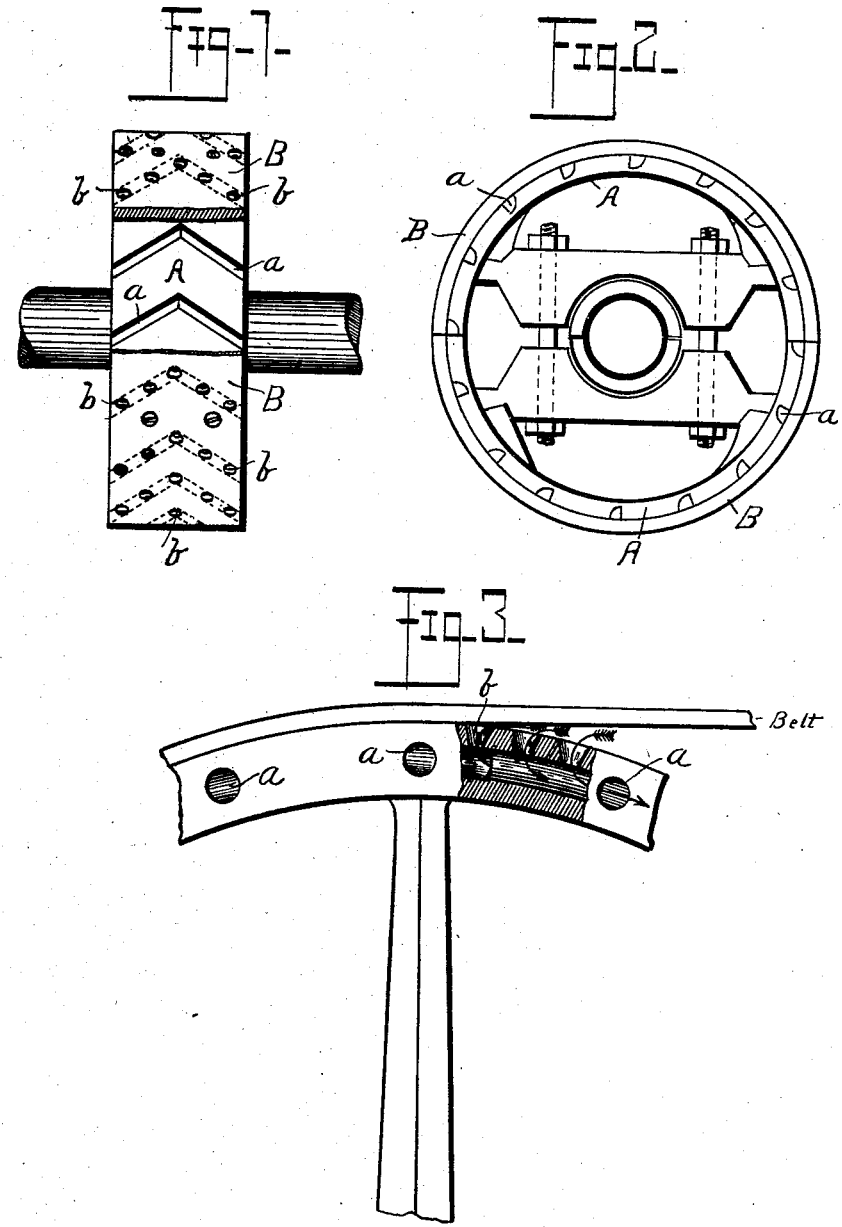
WITNESSES:
Harry Pagle.
Maggie Oltsch.
INVENTOR
John C. Knoblock.
BY
George Oltsch:
ATTORNEY.

UNITED STATES PATENT OFFICE.

JOHN C. KNOBLOCK, OF SOUTH BEND, INDIANA.

PULLEY.

SPECIFICATION forming part of Letters Patent No. 605,104, dated June 7, 1898.

Application filed November 29, 1897. Serial No. 660,107. (No model.)

*To all whom it may concern:*

Be it known that I, JOHN C. KNOBLOCK, a citizen of the United States, residing at South Bend, in the county of St. Joseph and State of Indiana, have invented certain new and useful Improvements in Pulleys; and I do hereby declare the following to be a full, clear, and exact description of the invention, such as will enable others skilled in the art to which it appertains to make and use the same.

My invention relates to an improvement in pulleys; and it consists in a pulley having its outer surface formed of one or more parts which have a series of openings made through their bearing-surfaces, and which openings connect with grooves or channels which extend in under the bearing-surfaces of the pulley at suitable angles, so as to intersect each other at their inner ends, and which grooves or channels communicate with the openings through the rim of the pulley, as will be more fully described hereinafter.

The object of my invention is to provide the bearing-surface of pulleys with openings through which the air which is drawn in between the surface of the pulley and the belt makes its escape and to prevent air-cushions from forming between the belt and the pulley, and thus enable the belt to adhere more closely to the pulley than it is possible to do when the same is running rapidly where no escape for the air is provided.

In the accompanying drawings, Figure 1 is an edge view of a pulley shown partly in section and which embodies my invention. Fig. 2 is a side elevation of the same. Fig. 3 is an enlarged detail view of a pulley formed in a single piece and which has a portion of its surface broken away so as to show the air-openings.

A represents the body of a pulley, which is made of two parts clamped together, as shown in Fig. 2, and which parts have formed in their outer surfaces suitable grooves or channels which extend inwardly toward the center of the outer edges of the two parts, and which grooves or channels are so arranged as to intersect each other at the center of the outer surfaces, as shown in Fig. 1. These grooves or channels *a* will preferably be formed in casting the two parts A, but they may be cut afterward, if so desired. The outer bearing-surfaces B are made separate from the two parts A and are secured thereto by means of screws or other suitable fastenings. Each part A has a series of conical openings *b* made through it, and these openings are arranged at such an angle to each other as to coincide with the grooves or channels *a* made in the surfaces of the two parts A, as shown in Fig. 1.

Should it not be desired to form the pulley of a number of different parts, as shown in Figs. 1 and 2, it may be cast or formed in a single part, as shown in Fig. 3, and then the lateral grooves or channels will be drilled or otherwise formed in the outer edge of the pulley and the conical openings be made through the rim of the pulley, so as to communicate therewith.

Having thus described my invention, I claim—

A pulley, having opposite air-channels formed within the rim and leading from the edge of said pulley to a point of intersection at the center, and a series of perforations through the rim communicating with said channels, substantially as described.

In testimony whereof I affix my signature in presence of two witnesses.

JOHN C. KNOBLOCK.

Witnesses:
HARRY PAGLE,
MAGGIE OLTSCH.